United States Patent [19]

Foster

[11] Patent Number: 4,875,274
[45] Date of Patent: Oct. 24, 1989

[54] METHOD OF CUTTING METAL STUD AND BENDING AND SECURING SAME TO FORM ANGEL MEMBER

[76] Inventor: Larry L. Foster, P.O. Box 1283, Modesto, Calif. 95353

[21] Appl. No.: 195,808

[22] Filed: May 19, 1988

Related U.S. Application Data

[62] Division of Ser. No. 30,237, May 19, 1988, Pat. No. 4,787,283.

[51] Int. Cl.⁴ .............................................. B23P 11/00
[52] U.S. Cl. .................................... 29/525.1; 52/658; 83/23; 83/453; 83/463; 83/580; 83/682
[58] Field of Search .................. 83/917, 580, 682, 683, 83/453, 463, 55; 52/658, 657, 656; 29/525.1

[56] References Cited

U.S. PATENT DOCUMENTS

| | | | |
|---|---|---|---|
| 1,513,100 | 8/1923 | Frederick | 83/917 X |
| 1,531,287 | 3/1925 | Jensen | 83/917 X |
| 2,227,185 | 12/1940 | Goldsmith et al. | |
| 2,837,160 | 6/1958 | Vera et al. | |
| 3,065,657 | 11/1962 | Thompson | 83/917 X |
| 3,213,741 | 10/1965 | Harding | 83/917 X |
| 3,277,763 | 10/1966 | Haug | 83/917 X |
| 3,299,759 | 7/1965 | Johnson et al. | 83/917 X |
| 3,393,595 | 7/1968 | Halverson et al. | |
| 3,938,413 | 2/1976 | Goettel et al. | 83/917 X |

Primary Examiner—Frank T. Yost
Assistant Examiner—Rinaldi Rada
Attorney, Agent, or Firm—Fleit, Jacobson, Cohn, Price, Holman & Stern

[57] ABSTRACT

A die body is provided defining a longitudinal channel therethrough including the cross-sectional shape of a metal stud to be cut and an opening is formed through the die body extending normal to the web of the channel and including a first arm portion extending along one longitudinal margin of the channel and a second arm portion extending from the first arm portion to a point spaced slightly inward of the other longitudinal margin of the channel, the first arm portion of the opening including opposite side portions thereof disposed inward and outward of the one longitudinal margin of the channel. The channel snugly, longitudinally slidably receives a metal stud therethrough with the inner and outer surfaces of the stud, except in the areas thereof registered with the aforementioned opening, backed by opposing surfaces of the die body and a cutting die is provided having the same cross-sectional shape as the cross-sectional shape of the opening and may be forced through the latter to cut away all portions of the metal stud registered with the opening.

8 Claims, 6 Drawing Sheets

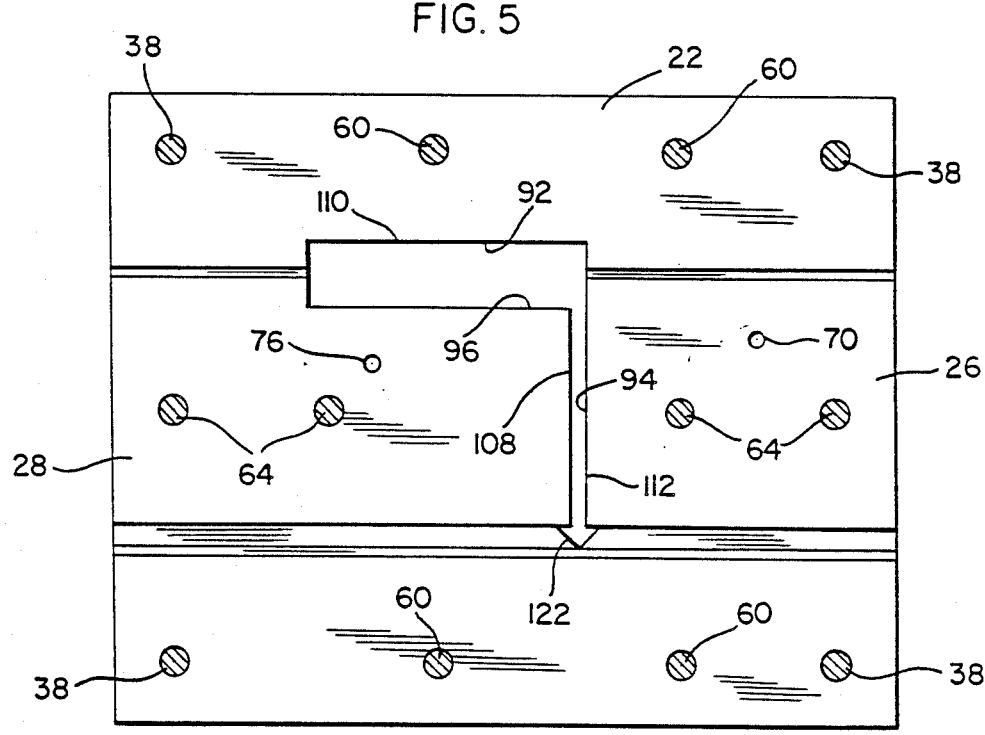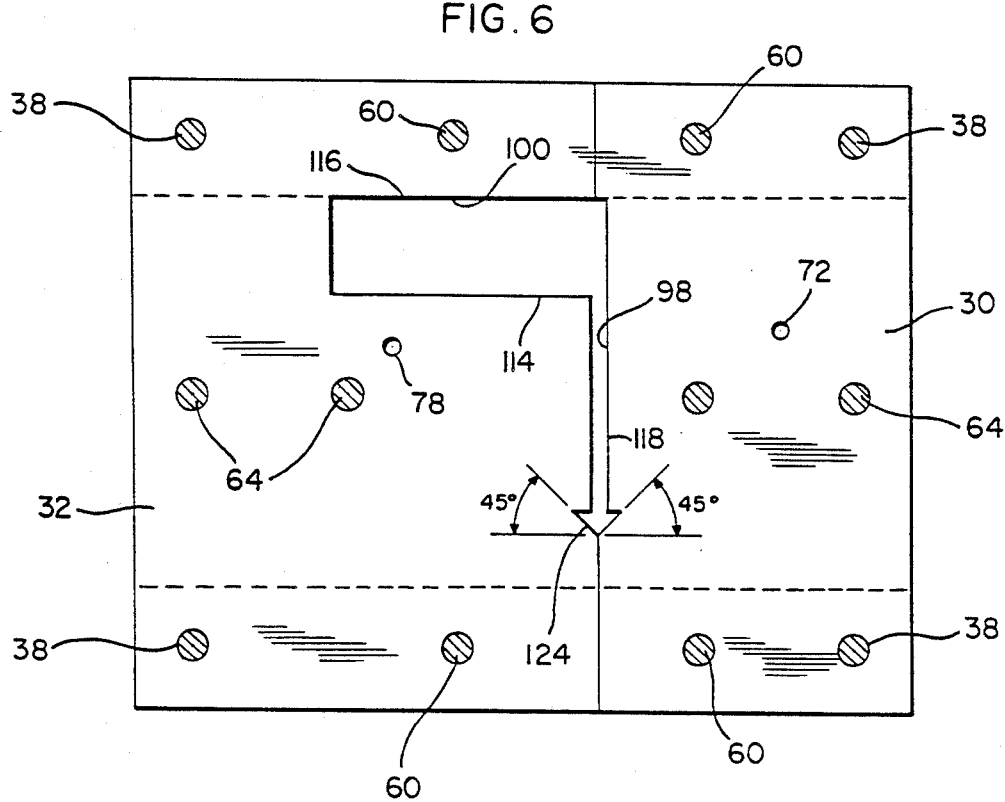

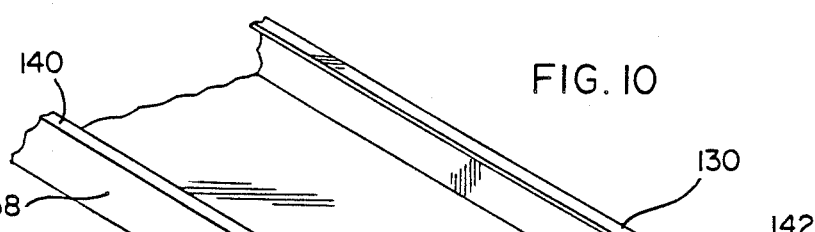
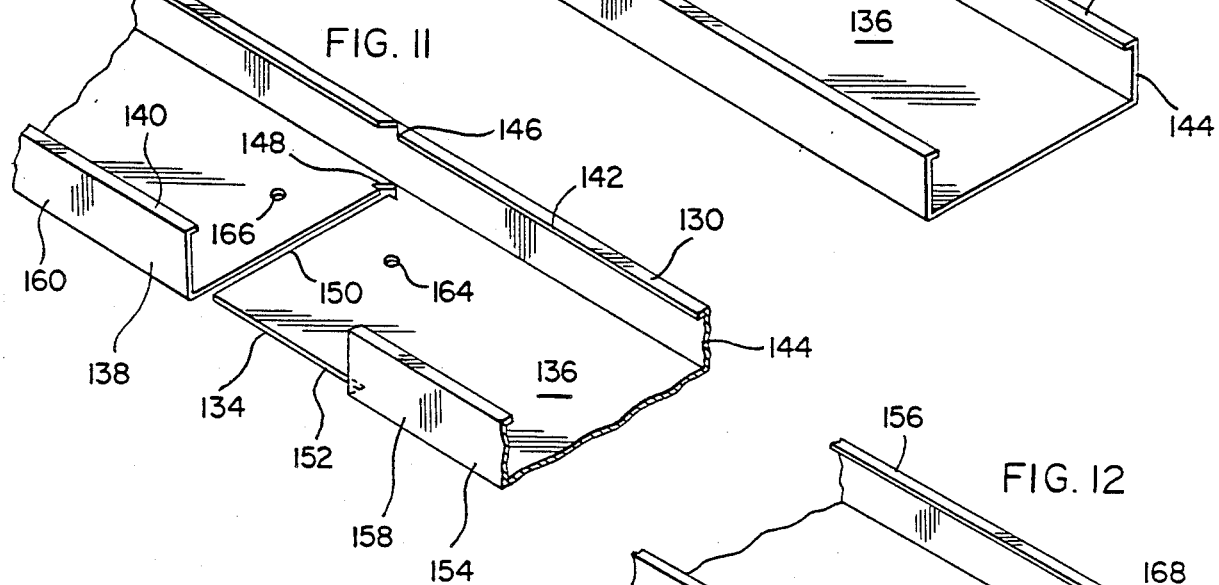
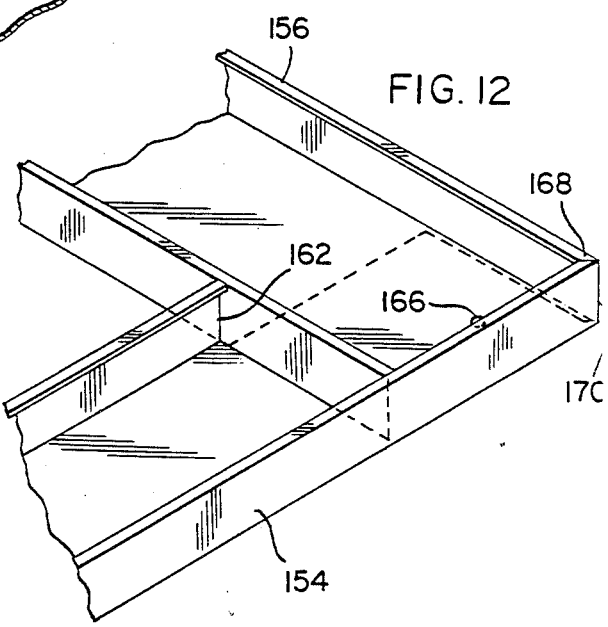
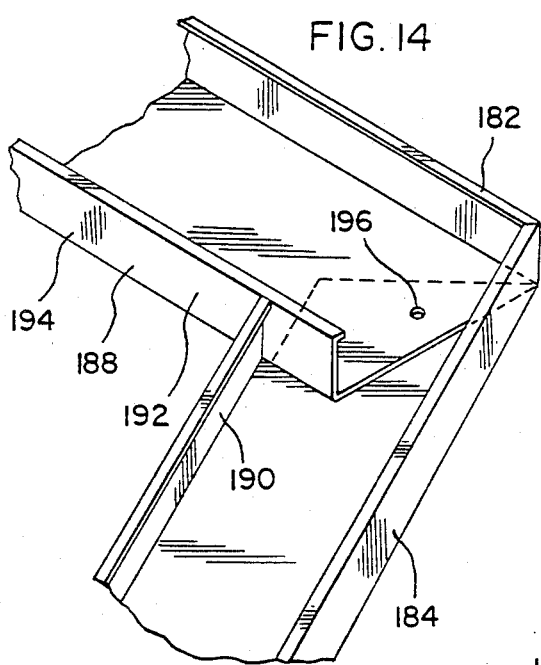
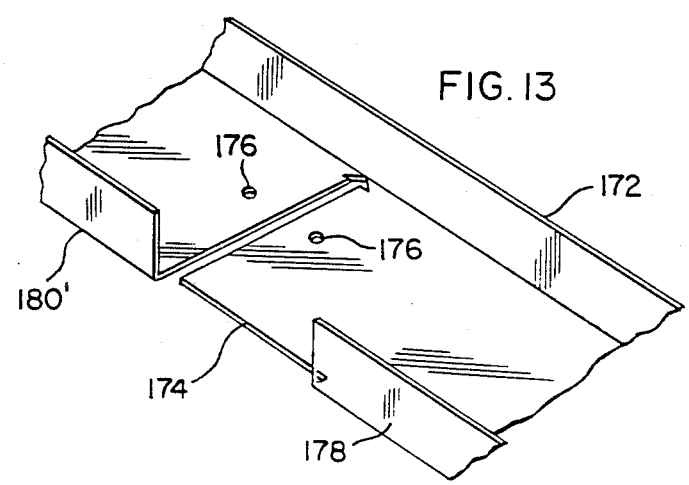

METHOD OF CUTTING METAL STUD AND BENDING AND SECURING SAME TO FORM ANGEL MEMBER

This is a divisional of Application Ser. No. 030,237, filed Mar. 26, 1987, now U.S. Pat. No. 4,787,283.

BACKGROUND OF THE INVENTION

1. FIELD OF THE INVENTION

This invention relates to a die assembly into which metal studs and channels may be inserted and which may be used to cut a stud or channel, intermediate its opposite ends, in a manner enabling opposite end sections of the stud or channel to be relatively angulated about an axis immediately inward of one side flange thereof and disposed normal to the web of the stud or channel. The die is capable of forming the cut in a manner such that portions of the flanges of the stud or channel on opposite sides of the cut will be abutted against each other and portions of the webs of the stud or channel will be disposed in overlapped engagement and secured together in order to maintain the opposite end portions of the stud or channel in the desired relatively angulated positions.

SUMMARY OF THE INVENTION

The die of the instant invention is specifically adapted to make predetermined cuts in the web and one side flange of a metal stud or channel with the cut made enabling opposite end portions of the stud or channel on opposite sides of the cut to be relatively angulated a predetermined amount about an axis disposed immediately inward of the other side wall of the stud or channel and disposed normal to the web thereof. The die includes structure for backing the web of a channel or stud outwardly of the areas thereof to be cut, for backing both the inner and outer surfaces of the side flanges of the stud or channel and for backing the under surfaces of the inturned flanges of a stud in the areas immediately adjacent the cuts to be formed therein. In addition, the die includes guiding structure for the cutting die throughout its linear cutting stroke and also force means for yieldingly biasing the cutting die toward its ready position preparatory to making a cutting stroke.

The main object of this invention is to provide a die for forming cuts in a metal stud or channel to enable opposite end portions of the stud or channel on opposite sides of the cut to be angulated relative to each other about an axis immediately inward of one side marginal portion of the stud or channel and disposed normal to the web thereof.

Another object of this invention is to provide a die in accordance with the preceding object and constructed in a manner whereby the side flanges of the metal stud or channel remote from the aforementioned axis will abut each other to establish a limit of relative angulation of the adjacent stud or channel portions to the angle desired.

A further important object of this invention is to provide a die in accordance with the two preceding objects and which will enable opposite end portions of a metal stud or channel to be relatively angulated, as desired, with adjacent web portions of the relatively angulated end portions disposed in overlapped engagement with each other for securement of a fastener therethrough.

A final object of this invention to be specifically enumerated herein is to provide a die in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a horizontal sectional view taken substantially upon the plane indicated by the section line 5—5 of FIG. 2;

FIG. 6 is a horizontal sectional view taken substantially upon the plane indicated by the section line 6—6 of FIG. 2;

FIG. 10 is a fragmentary perspective view of a typical metal st cutting by the die;

FIG. 11 is a fragmentary perspective view of the metal stud of FIG. 10 after being cut by the die in order to right angularly displace the end sections of the stud;

FIG. 12 is a perspective view of the right angularly disposed end sections of the metal stud after bending;

FIG. 13 is a fragmentary perspective view of a metal channel after being cut by the die of the instant invention in order to enable the end sections of the metal channel to be relatively angulated 90° relative to each other;

FIG. 14 is a fragmentary perspective view of a metal stud cut by a die constructed in accordance with the present invention and with the end sections of the metal stud relatively angulated 45° relative to each other;

DESCRIPTION OF PREFERRED EMBODIMENT

Figure 1:
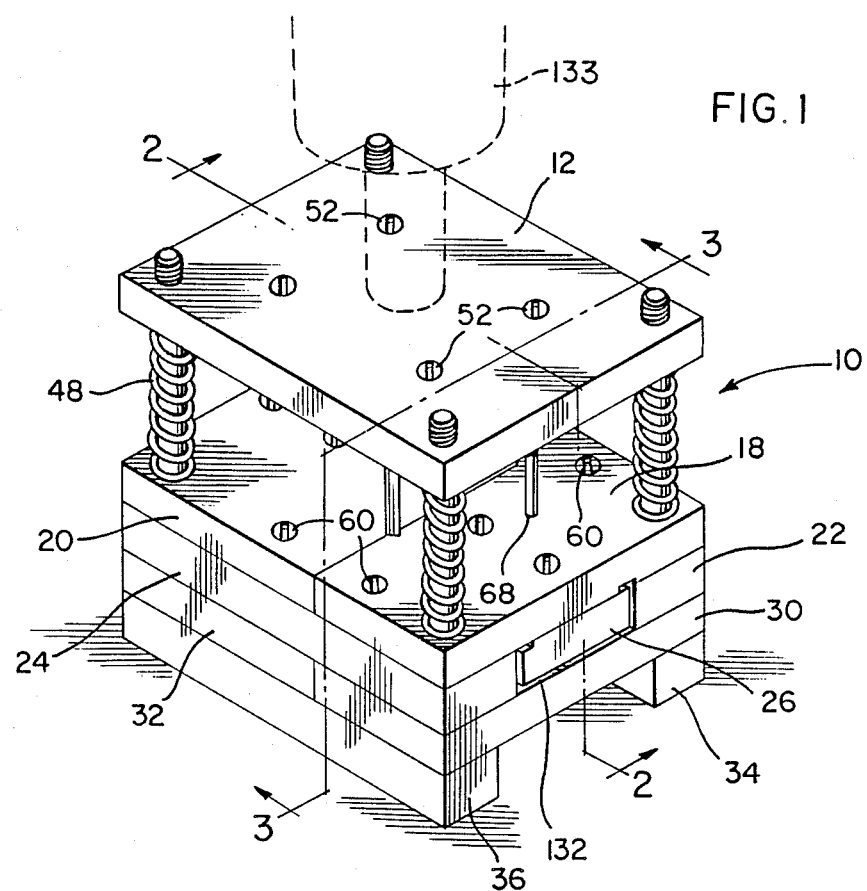
FIG. 1 is a perspective view of the die of the instant invention.
Figure 2:
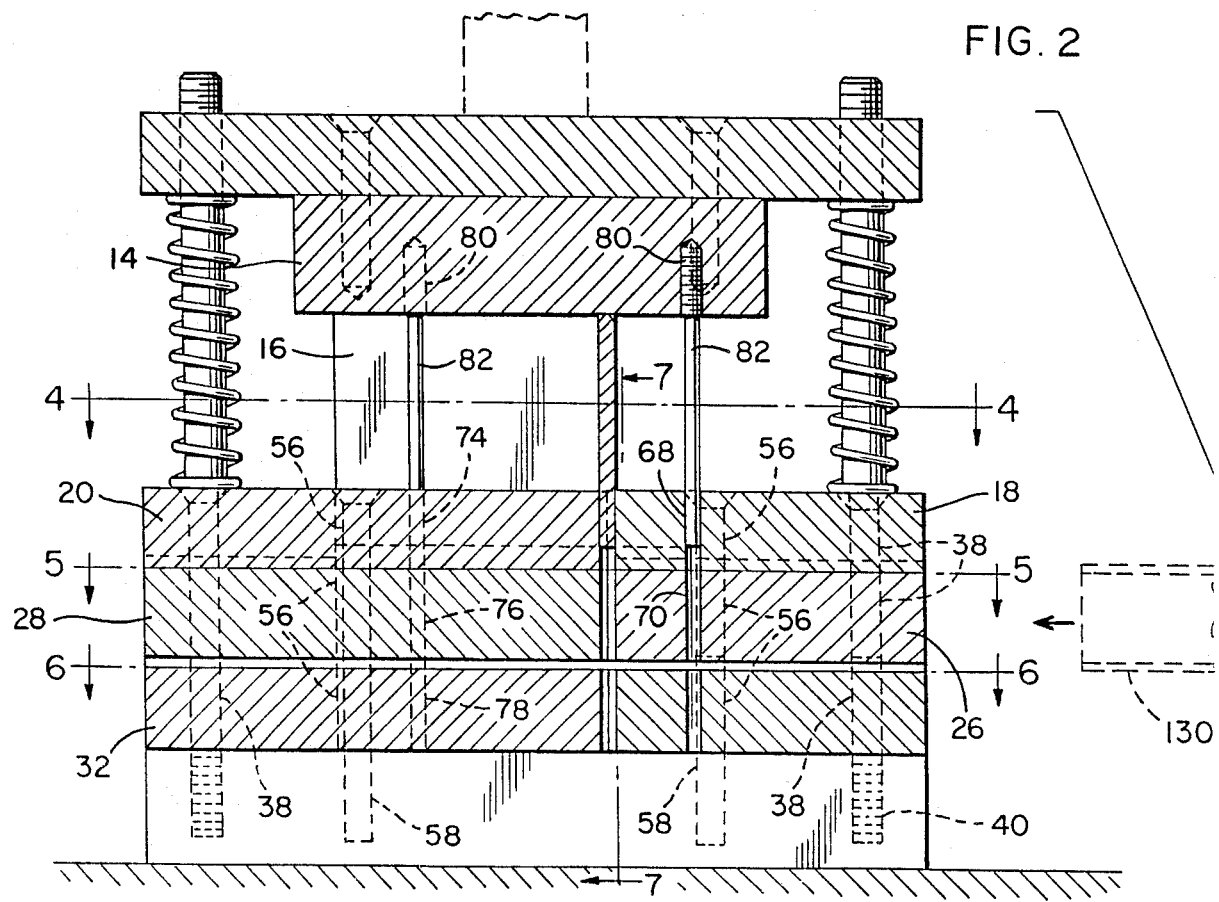
FIG. 2 is an enlarged vertical sectional view taken substantially upon the plane indicated by the section line 2—2 of FIG. 1.

Referring now more specifically to FIGS. 1 and 2 of the drawings, the die assembly of the instant invention is generally referred to by the reference numeral 10 and includes, downwardly vertically oriented, a top push plate 12 and a spacer block 14 immediately beneath the push plate and dependingly supporting a cutting die 16 therebeneath. A pair of die guide plates 18 and 20 are disposed in horizontally abutting relation and underlie the push plate 12 and die 16 and a pair of opposite side die bars 22 and 24 underlie corresponding opposite side margins of the die guide plates 18 and 20, a pair of die plates 26 and 28 being supported from the underside of the die guide plates 18 and 20 between the die bars 22 and 24. Further, horizontally abutted die plate members 30 and 32 underlie the side die bars 22 and 24 and corresponding opposite side margins of the die plate members 30 and 32 have support bars 34 and 36 disposed thereunder.

The corner and end portions of the die guide plates 18, 20, the side die bars 22, and 24 and the die plate members 30, 32 have registered smooth bores 38 formed therethrough which are in turn registered with threaded bores 40 formed in the support bars 34 and 36, the lower diametrically reduced ends 42 of four guide pins 44 being passed downwardly through the bores 38 and threadedly engaged in the bores 40. Compression springs 48 are disposed about the guide pins 44 between the die guide plates 18, 20 and the underside of the push plate 12. The push plate 12 includes corner bores 50 formed therethrough which slidably receive the upper ends of the guide pins 44 therethrough. Also, it will be noted that threaded fasteners 52 removably secure the spacer block 14 to the underside of the central portion of the push plate 12.

The die guide plates 18, 20, the side die bars 22, 24 and the die plate members 30, 32 additionally include smooth bores 56 formed therethrough aligned with each other and threaded bores 58 are formed in the support bars 34, 36, threaded fasteners 60 being secured downwardly through the bores 56 and in the bores 58.

The die plate 26 is removably secured beneath the die guide plate 18 through the utilization of center threaded fasteners 64 and the die plate 28 is removably secured beneath the die guide plate 20 through the utilization of similar fasteners 66. Further, the die guide plate 18 includes a smooth bore 68 formed therethrough registered with corresponding bores 70 and 72 formed in the die plate 26 and the die plate member 30, respectively, and the die guide plate 20 includes a similar bore 74 formed therethrough registered with bores 76 and 78 formed in the die plate member 32 and the spacer block 14 includes downwardly opening threaded bores 80 formed therein in which the upper ends of punch dies 82 are secured, the lower ends of the punch dies 82 being received in the bores 68 and 74 and receivable downwardly in the bores 70, 72 and 76, 78.

Figure 4:
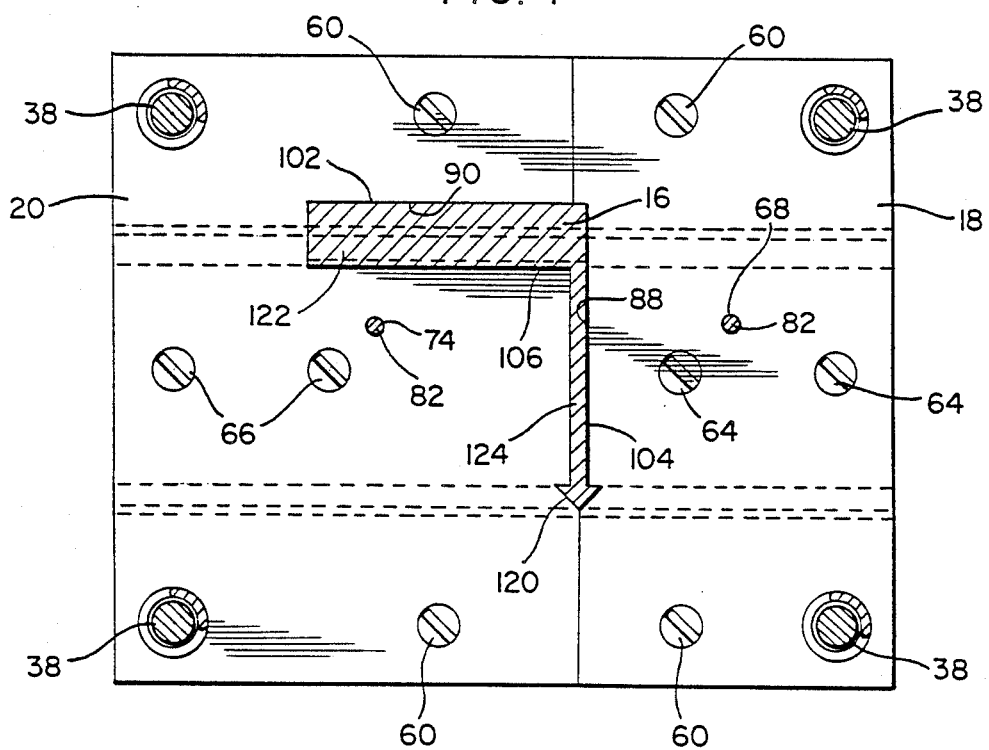
FIG. 4 is a horizontal sectional view taken substantially upon the plane indicated by the section line 4—4 of FIG. 2.
Figure 7:
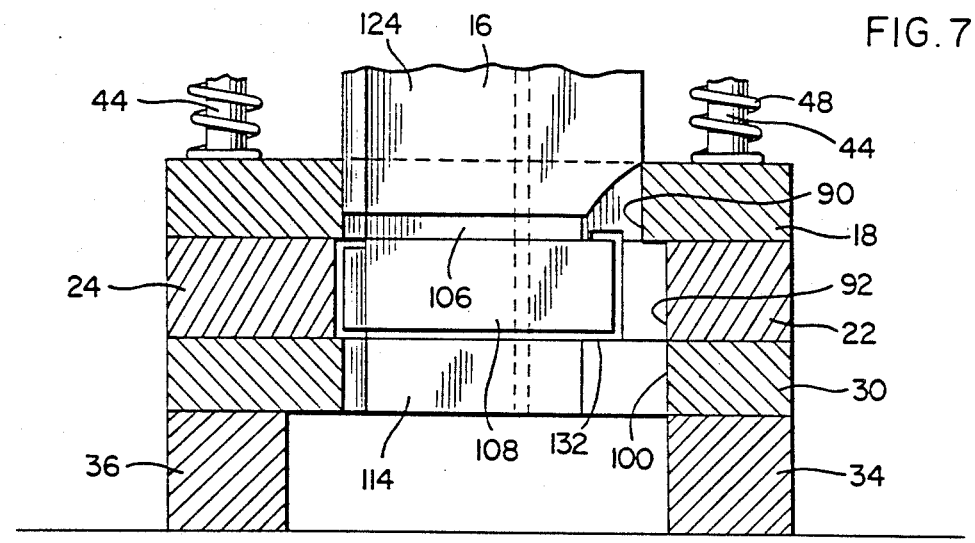
FIG. 7 is a fragmentary vertical sectional view taken substantially upon the plane indicated by the section line 7—7 of FIG. 2.
Figure 8:
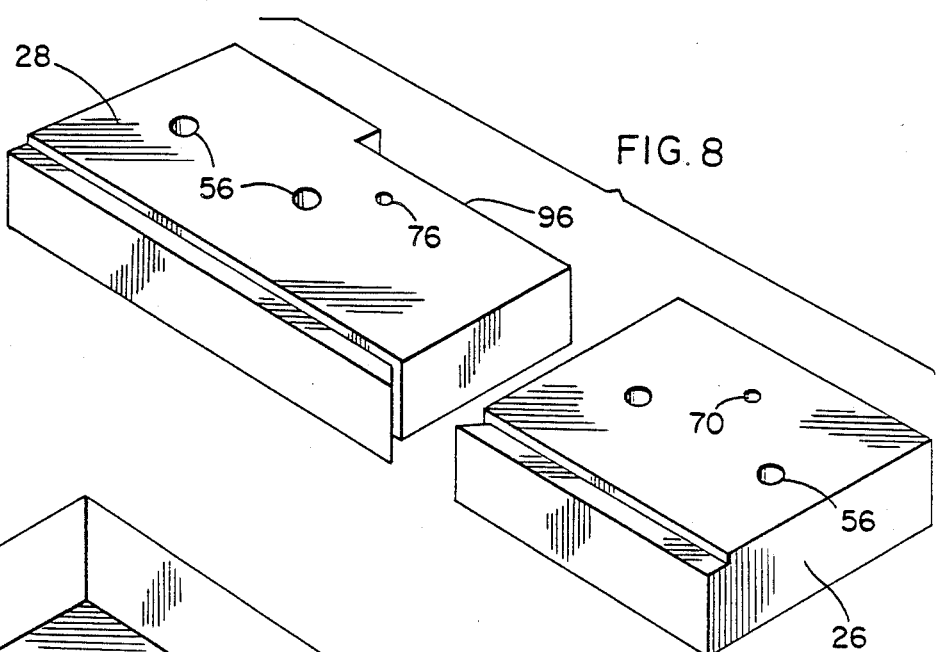
FIG. 8 is a perspective view of the two die guide plates of the instant invention.

With attention now invited more specifically to FIG. 4 of the drawings, it may be seen that the die guide plates 18 and 20 have opposing notches 88 and 90 formed therein and, from FIG. 5 of the drawings, it may be seen that the die side bar 22 has a notch 92 formed therein and that the die plates 26 and 28 have notches 94 and 96 formed therein. Finally, from FIG. 6 of the drawings it may be seen that the die plate members 30 and 32 have notches 98 and 100 formed therein.

With attention now invited again to FIG. 4, it may be seen that the notches 88 and 90 define generally right angulated thick and narrow arm portions 102 and 104 of an opening 106 which is generally L-shaped in plan. The notches 92, 94 and 96 define a further opening 108 including generally right angulated thick and narrow arm portions 110 and 112 and a corresponding opening 114 including thick and narrow arm portions 116 and 118 is defined by the notches 98 and 100, the free ends of the arm portions 104, 112 and 118 including arrow head shaped terminal ends 120, 122 and 124.

Figure 9:
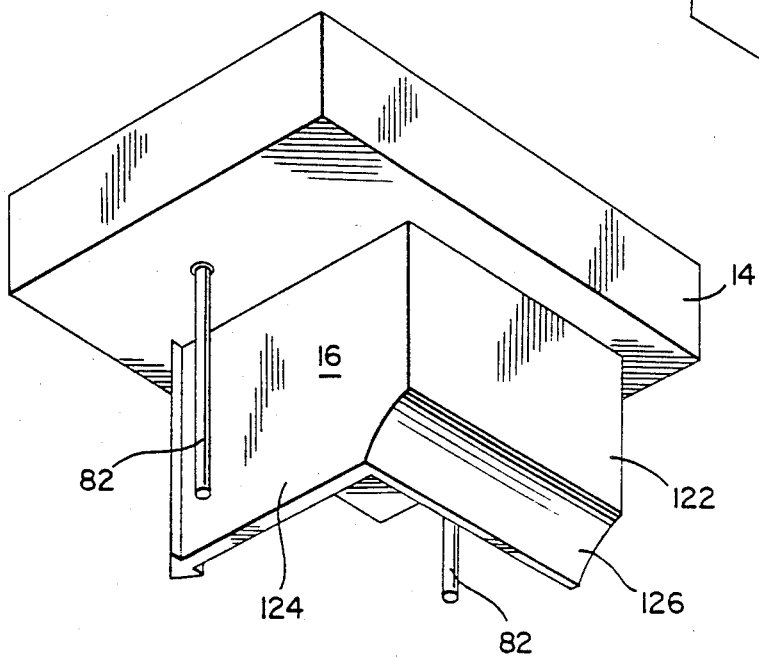
FIG. 9 is a perspective view of the spacer block and cutting die assembly of the invention.

The openings 106, 108 and 114 are vertically registered. The cutting die 16 is welded to the underside of the spacer block 14 and is substantially the same plan shape as the openings 106 and 108 including right angulated wide and narrow arm portions 123 and 125 receivable downwardly through the wide and narrow arm portions of the openings 106, 108 and 114. In addition, the lower marginal edge of the wide arm portion 122 of the die 16 is concavely beveled as at 126, see FIG. 9.

Figure 3:
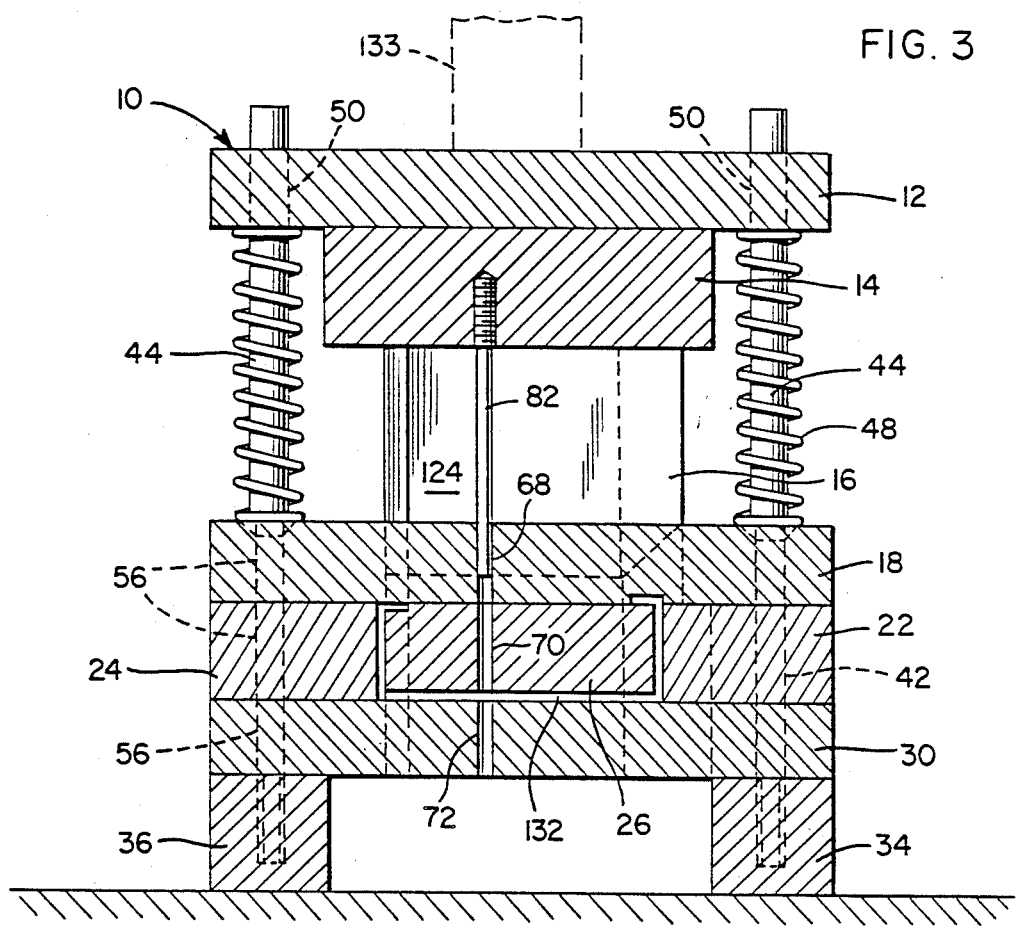
FIG. 3 is an enlarged vertical sectional view taken substantially upon the plane indicated by the section line 3—3 of FIG. 1.

In operation, and assuming that the springs 48 have yieldingly upwardly biased the push plate 12 to the upper position thereof illustrated in FIGS. 1, 2 and 3 with the punch dies and cutting die retracted upwardly into the die guide plates 18 and 20, a metal stud such as that indicated at 130 in FIG. 10 is telescoped into the die assembly 10 in the stud cross-section shaped opening 132 formed between the side die bars 22 and 24 and the die plate members 30, 32 and die guide plates 18, 20. After the metal stud 130 has been positioned as desired, a ram 133 (or other suitable force means) is used to downwardly displace the push plate 12 and the cutting die 16 whereupon an L-shaped cut 134 will be formed in the web 136 and through the side flange 138 of the stud 130. In addition, the inturned flange 140 carried by the side flange 138 will be cut as illustrated in FIG. 11 and the inturned flange 142 carried by the side flange 144 of the stud 130 will be notched as at 146. The L-shaped cut 134 includes an arrowhead shaped terminal end 148 at the free end of the narrow arm portion 150 thereof and the wide arm end portion 152 of the cut 134 extends along the longitudinal margin of the web 136 remote from the side flange 144. After the cut 134 is formed, the opposite end sections 154 and 156 of the stud 130 may be relatively angulated 90° to the positions thereof illustrated in FIG. 12 in order to form a right angle corner, the end portions 158 and 160 of the flange 138 which were disposed on opposite sides of the cut 134 abutting each other as at 162, see FIG. 12. In addition, during the cutting action of the cutting die 16 on the stud 130, the punch dies 82 form apertures 164 and 166 on opposite sides of the narrow arm portion 150 of the cut 134 and the apertures 164 and 166 are registered with each other when the end sections 154 and 156 are swung to their right angularly disposed positions illustrated in FIG. 12, whereby a suitable fastener may be secured through the registered apertures 166 and 164.

It will be noted that the notch 146 and terminal end 148 of the arm portion 150 of the cut 134 form abutting mitered joints 168 at the upper and lower portions of the outside corner 170 defined by the right angulated end sections 154 and 156.

With attention now invited more specifically to FIG. 13, it may be seen that a metal channel 172 may have a cut 174 formed therein corresponding to the cut 134 and also apertures 176 formed therein corresponding to the apertures 164 and 166 through utilization of the die assembly 10. The only difference between cutting the stud 130 and the metal channel 172 is that there are no inturned flange portions corresponding to the inturned flanges 140 and 142 to cut. Otherwise, the same type of cut is made in order to allow the end sections 178 and 180 of the metal channel 172 to be relatively angulated and securely fastened in relatively angulated positions.

With attention now invited more specifically to FIG. 14, there may be seen a metal stud 182 corresponding to the stud 130 and which includes opposite end sections 184 and 188 corresponding to the end sections 154 and 138. However, the metal stud 182 has been cut in order to relatively angulate the end sections 184 and 188 approximately 45°, the length of the wide arm portion of the cut formed in the metal stud 82 and corresponding to the wide arm portion 152 of the cut 134 being shorter and thereby allowing the end portions 190 and 192 of the side flange 194 of the metal stud 182 corresponding to the end portions 158 and 160 of the side flange 138 of the metal stud 130 to abut each other as the end sections 184 and 188 are swung to their 45° relatively angulated positions. Of course, in order to carry out the invention as illustrated in FIG. 13, the length of the wide arm portion 122 and notches 90, 92 and 100 are shortened. Also, the positioning of the apertures 196 corresponding to the apertures 164 and 166 must be changed in order to allow the apertures 196 to register with each other when the end sections 182 and 184 are relatively angularly displaced 45°.

Of course, the length of the wide arm portion 152 of the cut 134 extending along the stud 130 may be increased in order to allow the end sections 154 and 156 to be relatively angulated more than 90°. In this instance the narrow arm portion 150 of the cut 134 will be V-shaped in plan, tapering toward the side flange 144.

With attention again invited to FIGS. 11 and 12, it will be noted that the terminal end 148 of the narrow arm portion 150 of the cut 134 not only enables the abutted mitered joints 168 to be formed, but also allows one end portion of the web 136 to slip up and over the other end portion of the web 136. Further, if it is desired to relatively angulate the end sections 154 and 156 more than 90°, the narrow arm portion 150 must necessarily be generally V-shaped tapering toward the side flange 144 and, of course, the length of the wide arm portion 152 will be considerably greater than that illustrated in FIG. 11.

Figure 15:
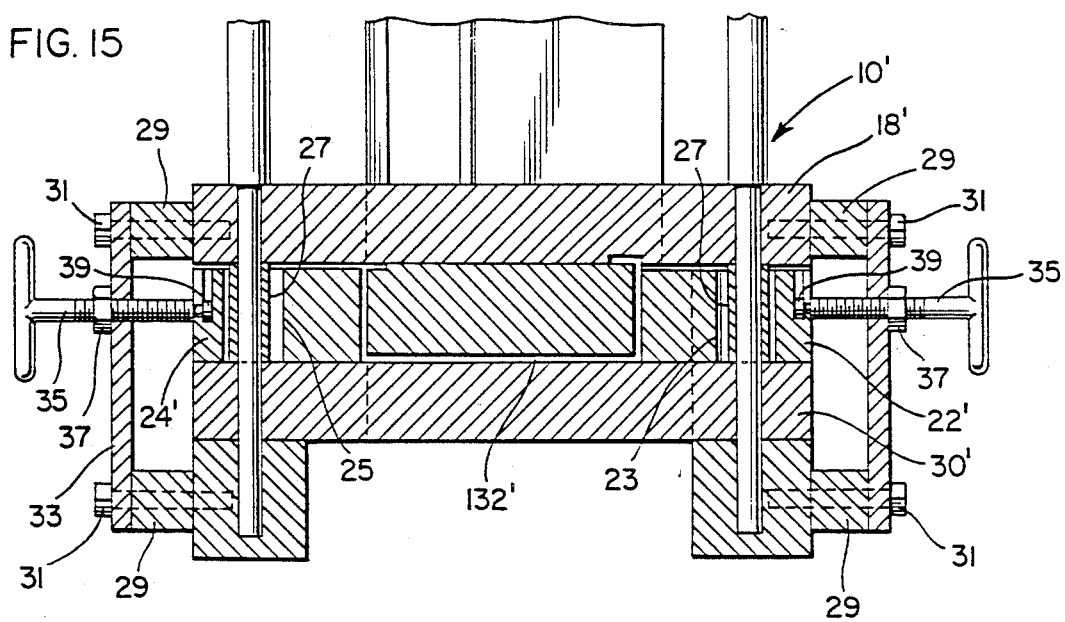
FIG. 15 is a sectional view similar to FIG. 3, but illustrating a modified form of the invention.

With attention now invited to FIG. 15, the reference 10' generally designates a die assembly which is substantially identical to the die assembly 12, except that the opposite side die bars 22' and 24' corresponding to the opposite side die bars 22 and 24 include longitudinally spaced pairs of transverse slots 23 and 25 formed therein. In addition, spacer sleeves 27 extend through the slots 23 and 25 and support the guideplate 18' corresponding to the guideplate 18 from the die plate member 30 corresponding to the die plate member 30. Of course, it will be noted that the die assembly 10' also includes a slotted die guide plate (not shown) corresponding to the die guide plate 20 having similar slots 23 and 25 formed therein as well as similar sleeves 27 disposed in the similar slots.

From a comparison of FIGS. 3 and 15, it may be seen that the opposite side die bars 22' and 24' are not as thick as the blocks 22 and 24. Accordingly, with the sleeves 27 supporting the guide plate 18' from the die plate member 30' and also the die guide plate of the assembly 10' corresponding to the plate 20 from the die plate member of the assembly 10' corresponding to the die plate member 32, the die bars 22' and 24' may shift laterally of the assembly 10' in order to tightly clamp a stud within the stud cross-section shaped opening 132' corresponding to the opening 132. In order to positively shift the die bars 22' and 24' inward and outward relative to a channel disposed in the opening 132' the opposite sides of the assembly 10' each have opposite end pairs of upper and lower mounting blocks 29 removably supported therefrom through the utilization of fasteners 31 and each pair of corresponding upper and lower mounting blocks 29 supports a vertical support plate 33 therefrom by the corresponding fasteners 31. Each of the support plates threadingly supports a clamp screw 35 therefrom equipped with a lock nut 37 engagable with the outer side of the corresponding support plate 33 and the inner end of each clamp screw 35 includes an enlarged head 39 captively and rotatably retained in a slot provided therefor in the corresponding side die bar end. Therefore, the nuts 37 may be loosened and the clamp screws 35 may be backed out in order to laterally outwardly shift the side die bars 22' and 24' before a stud is inserted into the opening 32'. Then, after the stud inserted into the opening 32' has been properly longitudinally positioned relative to the die assembly 10', the clamp screws 35 may be turned inwardly until the stud inserted in the opening 132' is tightly clamped in position. The lock nuts 37 may then be tightened and the die assembly 10' may be actuated to make the desired cut in the stud.

Figure 16:
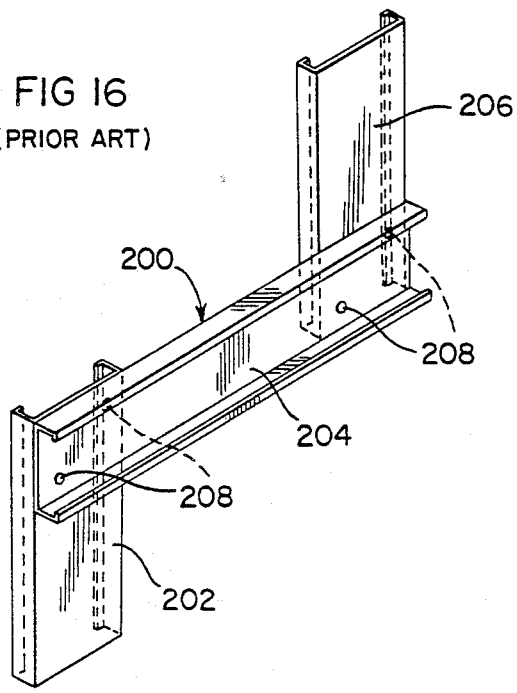
FIG. 16 is a perspective view of conventional angle framing construction.
Figure 17:
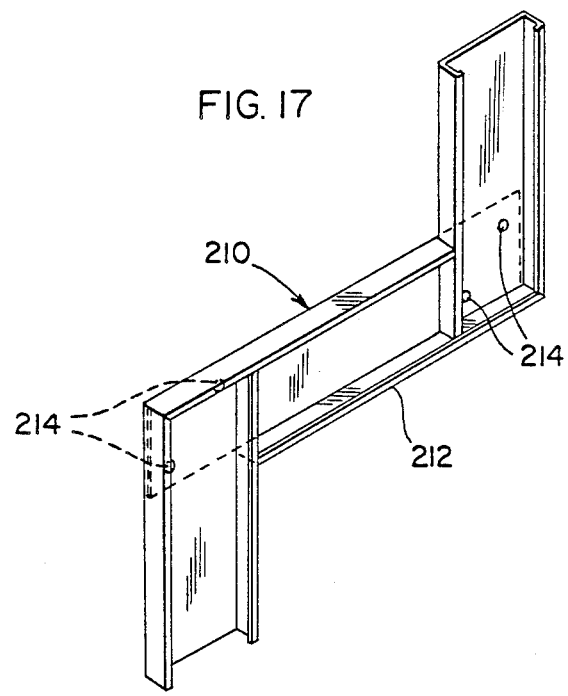
FIG. 17 is a perspective view of angle framing construction in accordance with the instant invention.

With attention now invited more specifically to FIG. 16, an angle framing construction is generally designated by the reference numeral 200. It will be noted that the construction 200 is formed from three different stud sections 202, 204 and 206. Further, the stud section 204 opens laterally in a direction opposite to the direction in which the stud sections 202 and 204 open and the three stud sections are secured together at end overlapped joints each including two fasteners 208. However, with attention invited more specifically to FIG. 17, an angle framing construction constructed in accordance with the present invention is generally designated by the reference numeral 210 and is formed from a single stud section 212 of a predetermined length and having two different cuts made therein corresponding to that illustrated in FIG. 11 and wherein a pair of fasteners 214 are used at each corner. However, with the angle framing construction 210 illustrated in FIG. 17, all of the channel member sections open in the same direction and a pair of corner constructions are provided which are considerably stronger than the corner constructions illustrated in FIG. 16.

Figure 18:
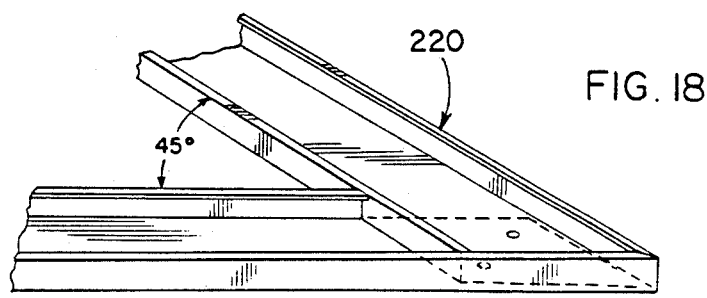
FIG. 18 is a perspective view similar to FIG. 14 but illustrating metal stud end sections relatively angulated 135°.

With attention now invited to FIG. 18, FIG. 18 illustrates the manner in which a 135° corner defining an included angle of 45° may be formed. This angle frame construction is referred to in general by the reference numeral 220 and is substantially identical to the similar construction illustrated in FIG. 12, except that the end portions of the stud are relatively angulated 135° and define an included angle of 45°, which angulation is afforded by a longer wide arm portion corresponding to wide arm portion 102.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. The method of forming an angle framing member from an elongated channel-shaped stud including generally parallel first and second longitudinal side flanges interconnected by a longitudinal web extending therebetween and from those opposite longitudinal margins said flanges are supported, said method including:

A. Cutting away a predetermined length of said first side flange to form an opening therethrough extending longitudinally of said stud and having opposite ends and a longitudinal mid-point spaced apart along the longitudinal extent of said stud;

B. Making a narrow transverse cut through said web extending from the longitudinal margin of said web corresponding to said first side flange and to a point immediately adjacent said second side flange and with the end of said transverse cut adjacent said second side flange spaced along said stud from said longitudinal mid-point of said opening;

C. Relatively angularly displacing the portions of said stud on opposite sides of said transverse cut about an axis normal to said web and substantially contained within said second side flange to positions with the portions of said web, disposed on opposite sides of said transverse cut, overlap engaged with each other and the portion of said first side flange defining one end of said opening abuttingly engaged with the outer surface of said first side flange spaced therealong from the other end of said opening, and;

D. Securing the overlap engaged portions of said web together.

2. The method of claim 1 wherein steps A and B are carried out through a single die cutting operation on said stud.

3. The method of claim 1 wherein the portion of said first side flange defining said one end of said opening, at the completion of step C, abuttingly engages the inner surface of said second side flange.

4. The method of claim 1 wherein the end of said transverse cut through said web adjacent said second side flange includes a wedge-shaped terminus.

5. The method of claim 1 wherein said side flanges include inturned flanges spaced from and opposing the corresponding longitudinal margins of said web, said inturned flange carried by said first side flange being cut away along a longitudinal extent thereof corresponding to the longitudinal extent of said opening during step A and said inturned flange carried by said second flange being notched to said second flange in registry with said end of said transverse cut adjacent said second side flange during step B.

6. The method of claim 5 wherein steps A and B are carried out through a single die cutting operation on said stud.

7. The method of claim 1 wherein the end of said transverse cut adjacent said first side flange is in substantially transverse alignment with said other longitudinal limit of said opening.

8. The method of claim 1 wherein said transverse cut generally parallels a plane disposed normal to the longitudinal extent of said stud.

* * * * *